UNITED STATES PATENT OFFICE.

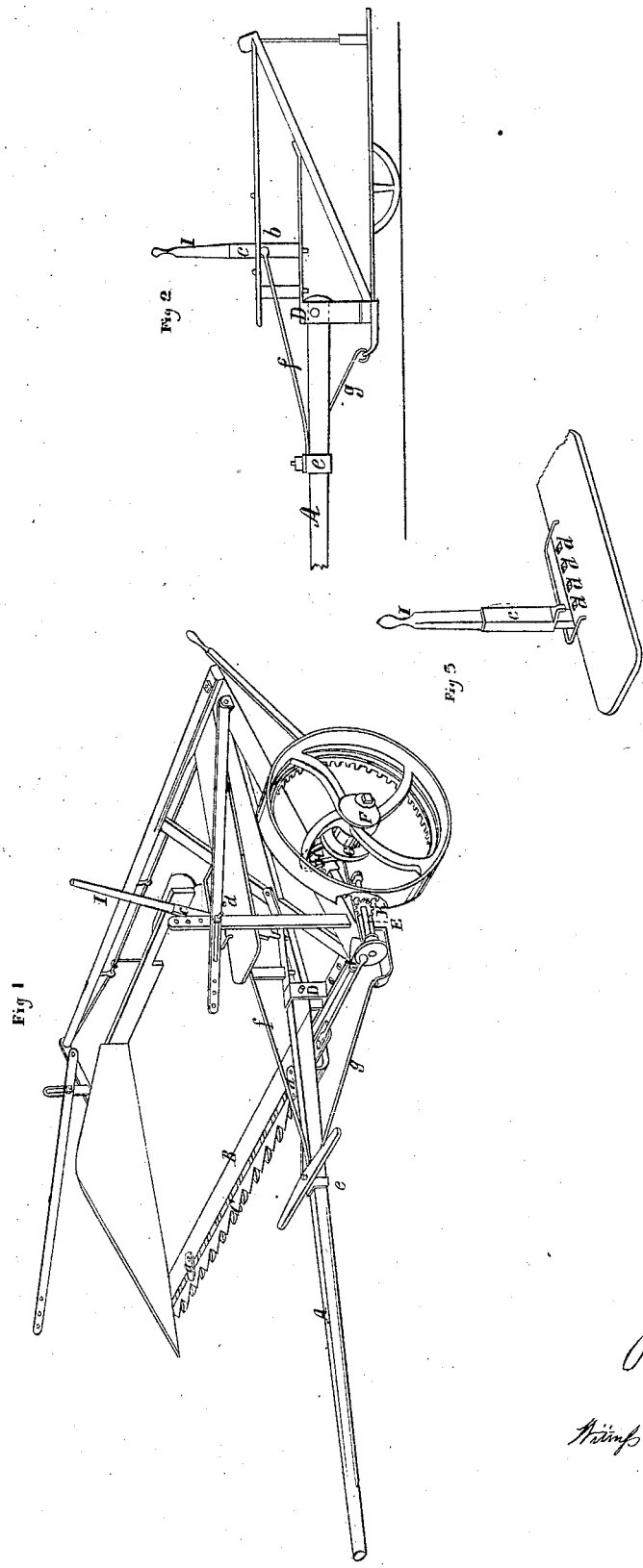

JOHN M. LONG, OF HAMILTON, OHIO, ASSIGNOR TO HIMSELF, PETER BLACK, AND R. ALLSATTER, OF SAME PLACE.

IMPROVEMENT IN HARVESTERS.

Specification forming part of Letters Patent No. 29,938, dated September 4, 1860.

*To all whom it may concern:*

Be it known that I, J. M. LONG, of Hamilton, in the county of Butler and State of Ohio, have invented a new and useful Improvement in Harvesters; and I do hereby declare that the following is a full and complete description of the same, reference being had to the accompanying drawings and letters of reference marked thereon, making part of this specification.

My improvement consists in an arrangement for elevating the cutter-bar and for lowering the same readily.

To enable mechanics of ordinary skill in this branch to make and use my invention, I will proceed to describe its construction and mode of operation.

Figure 1 is a perspective view of a complete harvester in which my improvements are represented. Fig. 2 is a sectional elevation, showing the draft-pole, guys, and shifting lever as they are operated to elevate and lower the cutter-bar.

Like letters of reference indicate corresponding parts in the different drawings.

A is the draft-pole. It is attached to and between the two parts of stirrup-plate D by a round bolt or pin.

B is the finger-bar; C, the cutter, the latter connected with the former by parallel links, by which the cutters, instead of having a direct reciprocating motion, traverse with a curvilinear motion.

K is the crank-shaft; E, the radial bar to which the boxes in which the crank-shaft revolves are secured. This bar, extending back, is pierced to receive the spindle or axle upon which the main wheel revolves. It thence extends still farther back, with an upward bend, forming a handle. The spindle or axle upon which the traction-wheel rotates is squared at its outer end for a wrench, while, after passing through the hub of the wheel F, the sheave G, and the bar E, it enters the slotted segment H and is secured by a recessed nut upon the inner side. This spindle is made with a shoulder which has a bearing against the outer face of bar E, and this, facing against the outer surface of segment H, permits the spindle or axle to be screwed firmly into the recessed nut, bringing the parts described all to a bearing and retaining the frame of the machine in position at any altitude to which it may be set, while the wheel is permitted to revolve freely upon the axle. The segment H is secured permanently to the frame, and having a curve corresponding to the hinging-point of radial bar E, it allows the frame to be raised or depressed to any desired position, and when fixed to be held by spindle and nut, as described; but while the frame is thus elevated or depressed it will be seen that the radial bar E, carrying the crank-shaft and pinion K, retains its true relative position to the spur-wheel, and that the pinion and wheel are thus always found in proper gear.

Referring now to shifting bar I, it will be seen to have a step in the rear extension of stirrup-plate D. It is also furnished with a sleeve, c, (represented in minor drawing, Fig. 3,) which is armed with a tooth adapted to holes in the seat-board, (represented by $d\,d$,) the purpose of which will presently be described.

Adapted to the draft-pole A, and sliding freely upon it, is the square band e. With this is connected the bar f, which, extending backwardly, joins to shifting bar I at the point designated by b in Fig. 2.

Joined to band e, and reaching back obliquely upon either side of the draft-pole to appropriate points on the frame, are stays or guys g, which preserve the true direction of the draft-pole and give it the required command over the machine.

On the opposite side of the machine from that represented in the drawings a wheel is employed corresponding to the traction-wheel; and this side of the machine is furnished with a slotted segment corresponding to H and a radial bar corresponding with E, their office being to permit of the adjustment of the frame of the machine to a level with the other end. The machine being now set to any required altitude for either reaping or mowing, and the driver being in his position adjacent to shifting bar I, and it being required to elevate the cutter-bar to clear any obstruction or to change the elevation permanently for any reason, he has merely to raise the sliding sleeve c, releasing the bar from the position in which it is held by the tooth locking in one of the holes d, press the bar forward, and allow the tooth to enter any other hole forward of the one from which it has been removed, retaining it there permanently or returning it at pleasure to a reverse direction of the shifting bar. The shifting bar I, acting through the bar $f$ upon square band $e$, causes it to slide forward, giving a relative elevation to the cutter-bar, while reversing the movement of the shifting bar causes a corresponding depression of the same, and the toothed sleeve $c$, being adapted to the holes $d$, retains the parts in the precise position in which they are placed.

Having fully described my invention, what I claim as new, and desire to secure by Letters Patent, is—

Lever I, toothed slide $c$, bar $f$, band $e$, and braces $g$ $g$, constructed, arranged, and operating substantially as described, in connection with draft-pole A.

JOHN M. LONG.

Witnesses:
CHARLES L. FISHER,
WM. CLOUGH.